US009023509B2

(12) United States Patent
Cho et al.

(10) Patent No.: US 9,023,509 B2
(45) Date of Patent: *May 5, 2015

(54) SECONDARY BATTERY

(75) Inventors: Ja-Kyung Cho, Yongin-si (KR);
Dae-Kyu Kim, Yongin-si (KR);
Hyo-Jung Song, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 267 days.

This patent is subject to a terminal disclaimer.

(21) Appl. No.: 13/031,141

(22) Filed: Feb. 18, 2011

(65) Prior Publication Data
US 2011/0244318 A1 Oct. 6, 2011

(30) Foreign Application Priority Data

Apr. 5, 2010 (KR) .................. 10-2010-0030908

(51) Int. Cl.
*H01M 6/12* (2006.01)
*H01M 2/10* (2006.01)
*H01M 2/02* (2006.01)
*H01M 10/04* (2006.01)

(52) U.S. Cl.
CPC ........ *H01M 2/1022* (2013.01); *H01M 10/0436* (2013.01); *H01M 2/0207* (2013.01); *H01M 2/0267* (2013.01); *H01M 2/0275* (2013.01); *H01M 2/1016* (2013.01)

(58) Field of Classification Search
USPC ........... 429/66, 127, 129, 130, 136, 138, 139, 429/142, 144, 162, 174, 184, 185, 186, 243
See application file for complete search history.

(56) References Cited

U.S. PATENT DOCUMENTS

| 2,635,128 | A | 4/1953 | Arbogast | |
|---|---|---|---|---|
| 6,743,546 | B1 | 6/2004 | Kaneda et al. | |
| 2001/0024757 | A1* | 9/2001 | Hwang et al. | 429/332 |
| 2004/0142236 | A1 | 7/2004 | Kim et al. | |
| 2005/0058889 | A1* | 3/2005 | Goishihara | 429/94 |
| 2005/0215651 | A1* | 9/2005 | Hamano | 521/47 |
| 2006/0154138 | A1 | 7/2006 | Miyamoto et al. | |
| 2007/0154787 | A1 | 7/2007 | Jang et al. | |

(Continued)

FOREIGN PATENT DOCUMENTS

| CN | 102097611 A | 6/2011 |
|---|---|---|
| EP | 2254187 A1 | 11/2010 |

(Continued)

OTHER PUBLICATIONS

Japanese Office Action dated Sep. 11, 2012 for Japanese Patent Application No. JP 2010-140658 which shares priority of Korean Patent Application No. KR 10-2010-0030908 with captioned U.S. Appl. No. 13/031,141.

(Continued)

*Primary Examiner* — Milton I Cano
*Assistant Examiner* — Jimmy K Vo
(74) *Attorney, Agent, or Firm* — Knobbe Martens Olson & Bear LLP

(57) ABSTRACT

A secondary battery includes an electrode assembly comprising a first electrode plate, a second electrode plate and a separator interposed therebetween, and an electrolyte. A case accommodates the electrode assembly and an electrolyte. A finishing material is attached to an outer surface of the electrode assembly. In the secondary battery, the finishing material has an adhesive property on at least one surface.

14 Claims, 3 Drawing Sheets

(56) References Cited

U.S. PATENT DOCUMENTS

| | | |
|---|---|---|
| 2010/0291432 A1 | 11/2010 | Kim |
| 2011/0008672 A1 | 1/2011 | Kim |
| 2011/0143190 A1* | 6/2011 | Cho et al. ............... 429/162 |
| 2011/0287302 A1 | 11/2011 | Kim |

FOREIGN PATENT DOCUMENTS

| | | |
|---|---|---|
| EP | 2341567 A | 7/2011 |
| JP | 04-296467 (A) | 10/1992 |
| JP | 11-162423 (A) | 6/1999 |
| JP | 2003-242970 (A) | 8/2003 |
| JP | 2004-228078 (A) | 8/2004 |
| JP | 2006-196276 (A) | 7/2006 |
| JP | 2007-073317 (A) | 3/2007 |
| JP | 2007-184238 (A) | 7/2007 |
| JP | 2007-265989 | 10/2007 |
| JP | 2008-130360 (A) | 6/2008 |
| JP | 2011-018631 (A) | 1/2011 |
| JP | 2011-243553 (A) | 12/2011 |
| KR | 10-2004-0066412 | 7/2004 |
| KR | 10-2006-0037852 | 5/2006 |
| KR | 2006-0056630 A | 5/2006 |
| KR | 10-2007-00966 49 | 10/2007 |
| KR | 2008-0019311 A | 3/2008 |
| KR | 10-2009-0064048 | 6/2009 |
| WO | WO 00/59063 A1 | 10/2000 |

OTHER PUBLICATIONS

Office Action dated Nov. 30, 2011 for corresponding KR Application No. 10-2010-0030908.

Korean Office Action dated Jun. 20, 2011 in Application No. 10-2010-0030908.

Office Action dated Nov. 8, 2013 for corresponding CN Application No. 201110084703.3.

Extended European Search Report issued on Aug. 3, 2011 for European Patent Application No. 11161126.5.

* cited by examiner

SECONDARY BATTERY

RELATED APPLICATIONS

This application claims priority to and the benefit of Korean Patent Application No. 10-2010-0030908, filed on Apr. 5, 2010, in the Korean Intellectual Property Office, the entire content of which is incorporated herein by reference.

BACKGROUND

1. Field

Embodiments of the present invention relate to a secondary battery, and more particularly, to a secondary battery capable of preventing the movement of an electrode assembly and the bending of an electrode tab in the interior of a case.

2. Description of the Related Technology

Recently, a variety of batteries has been used as power sources for small-sized electronic devices. Particularly, batteries such as lithium secondary batteries, which are small in size and large in capacity, are frequently used as power sources for mobile phones, notebook computers, camcorders and the like.

A lithium secondary battery is typically formed by accommodating an electrode assembly in the interior of a case. such as a pouch or a can, and injecting an electrolyte into the case. The electrode assembly may be divided into a wound-type electrode assembly and a stacked-type electrode assembly. The wound-type electrode assembly is typically formed by interposing a separator between positive and negative electrode plates and winding them in a jelly-roll shape. On the other hand, the stacked-type electrode assembly is typically formed by stacking a plurality of structures, each having positive and negative electrode plates, and a separator interposed therebetween.

In the wound-type electrode assembly, a finishing tape is typically attached on outer end surfaces of the electrode assembly so as to fix a portion to be finished. The electrode assembly having the finishing tape attached thereto is accommodated in a case, and an electrolyte is injected into the interior of the case. Then, the case is tightly sealed.

However, in the secondary battery described above, the electrode assembly is not adhered closely to the inner surface of the case. Hence, if an impact is applied to the secondary battery from the exterior of the case, the electrode assembly is moved in the interior of the case. Therefore, an electrode tab of the electrode assembly may become bent. Also, because the electrolyte typically serves as a lubricant, the electrode assembly may move inside the case. This occurrence may cause internal short circuits.

Particularly, in a pouch type case, the strength of the case is typically weak, and the safety of the case may be compromised. In case of a medium- or large-sized battery, a large amount of electrolyte can be distributed to a lower portion in a case, and thus unequally distributed in the case. Moreover, in a secondary battery using a pouch-type case, the appearance of the secondary battery may be unequal.

SUMMARY

In one embodiment, a secondary battery comprises a finishing material having an adhesive property on a surface of an electrode assembly, which can improve the adhesion between the case and the electrode assembly, and thus prevent the movement of the electrode assembly and the bending of an electrode tab in the interior of the case.

According to an aspect of the present invention, a secondary battery includes: an electrode assembly comprising a first electrode plate, a second electrode plate and a separator interposed therebetween; an electrolyte; a case for accommodating the electrode assembly and the electrolyte; and a finishing material attached to an outer surface of the electrode assembly, wherein the finishing material has an adhesive property on at least a surface.

The finishing material may include an oriented polystyrene (OPS) film.

The OPS film may have an adhesive strength of 6 to 15 kgf in the electrolyte.

The OPS film may not have the adhesive property when it is not immersed into the electrolyte.

The surface of the finishing material may be chemically changed by the electrolyte so that the finishing material has the adhesive property.

The finishing material may be attached to at least one major surface of the electrode assembly.

The finishing material may be attached to at least one major surface and another major surface opposite to the at least one major surface of the electrode assembly.

The finishing material may be attached to completely surround the outer surface of the electrode assembly.

An exterior tape may be further attached to a finishing portion of the electrode assembly.

As described above, according to embodiments of the present invention, the adhesion between the case and the electrode assembly is improved. Thus, it is possible to prevent the movement of the electrode assembly and the bending of the electrode tabs in the interior of the case. Also, the strength of the case is increased, and the inequality of the distribution of the electrolyte is minimized in a medium- or large-sized secondary battery. Thus, the uniformity of the external appearance of the secondary battery can be improved.

Accordingly, the alignment state of the electrode assembly is stably maintained, thereby preventing internal short circuits. Also, it is possible to prevent a low battery charge that can be caused by swelling of the electrode assembly.

Moreover, the reliability of the second battery can be enhanced in the long-term use of the secondary battery.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
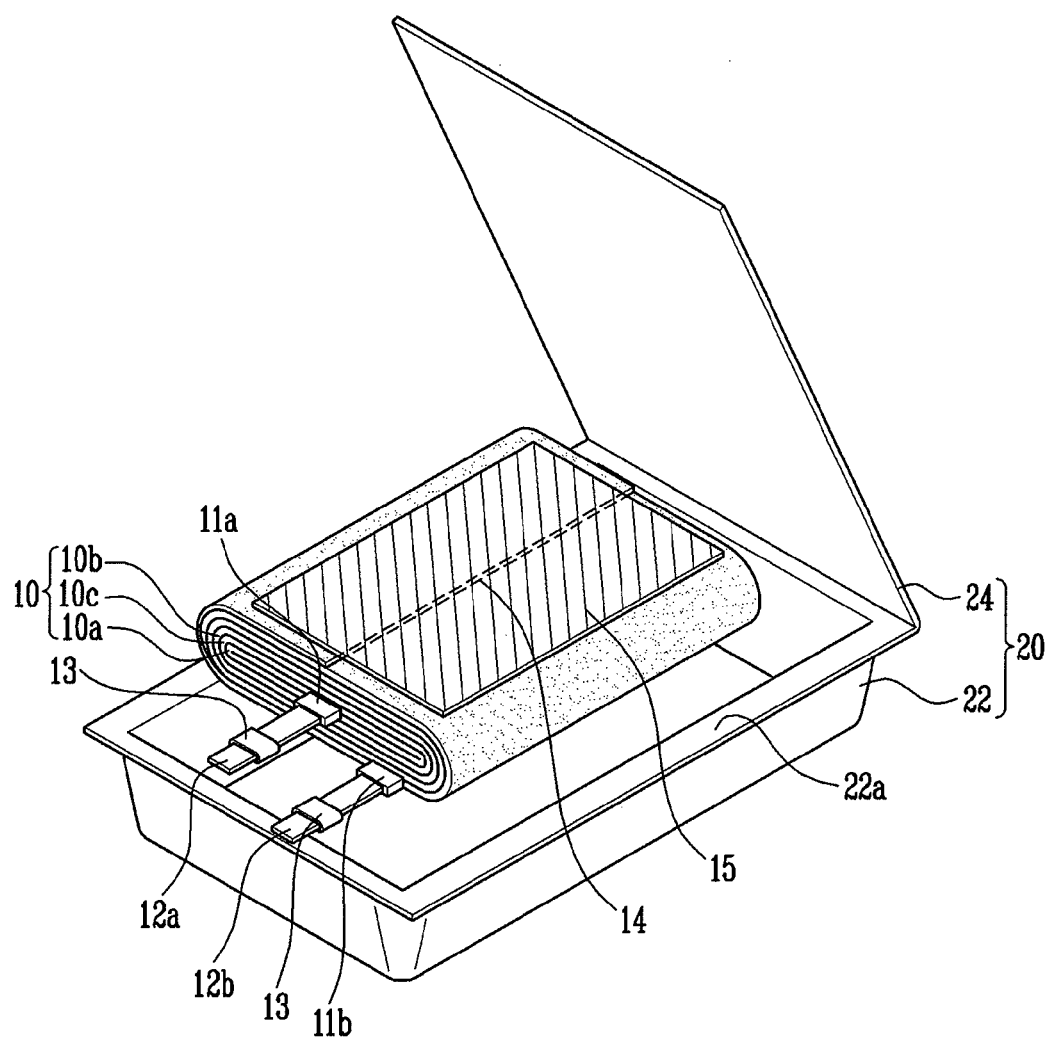
FIG. 1 is a perspective view of a secondary battery using an electrode assembly according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Figure 2:
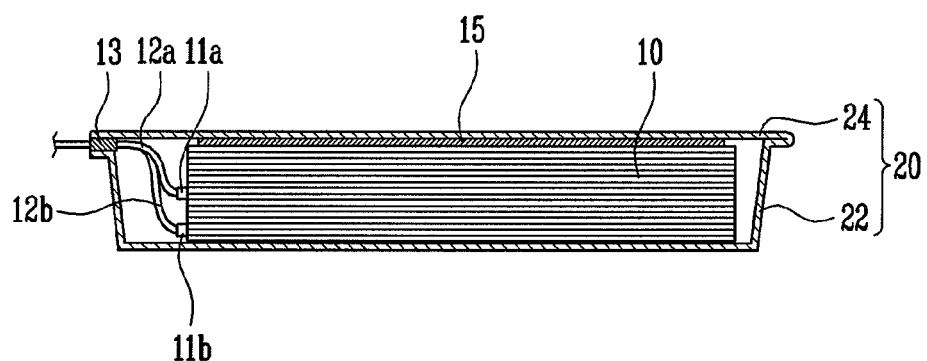
FIG. 2 is a sectional view of the secondary battery of FIG. 1.

FIG. 1 is a perspective view of a secondary battery using an electrode assembly according to an embodiment of the present invention. FIG. 2 is a sectional view of the secondary battery of FIG. 1.

Referring to FIGS. 1 and 2, a secondary battery according to an embodiment of the present invention includes an electrode assembly 10 and a case 20 in which the electrode assembly 10 and an electrolyte (not shown) are accommodated. The secondary battery can further include a finishing material 15. The finishing material may be attached to a major surface of the electrode assembly 10. The case 20 may be a pouch including an accommodating portion 22 and a cover portion 24 that seals the accommodating portion 22. The electrode assembly 10 may be a wound-type electrode assembly formed by sequentially stacking a first electrode plate 10a, a second electrode plate 10b and a separator 10c interposed therebetween, and then winding them in a jelly-roll shape.

When the electrode assembly 10 is a wounded-type electrode assembly as described in this embodiment, a finishing material 15 may be further included in the electrode assembly 10. A material having adhesion with respective to the case 20 may be used as the finishing material 15. The finishing material 15 may replace an exterior tape to prevent unwinding of the wound electrode assembly 10. At this time, the finishing material 15 may be formed on a major surface of the electrode assembly 10, at which a finishing portion 14 of the electrode assembly 10 is formed, or may also be formed on an opposite major surface of the electrode assembly 10. Although not shown in these figures, the finishing material 15 may be used after the exterior tape is attached to the finishing portion 14 of the electrode assembly 10.

The finishing material 15 may become chemically changed by the electrolyte. The surface of the finishing material 15 may have an adhesive property through the chemical change. The electrode assembly 10 having the finishing material 15 attached thereto can be accommodated in the pouch 20, and the electrolyte can be injected into the pouch 20. The electrolyte can allow the finishing material 15 to have an adhesive property. Thus, the electrolyte assembly 10 may be adhered closely to the pouch 20, thereby reinforcing the adhesion between the electrode assembly 10 and the pouch 20.

The finishing material 15 can include a material having a surface that is chemically changed to have an adhesive property when it is immersed into the electrolyte. For example, the finishing material 15 may include an oriented polystyrene (OPS) film and the like.

The OPS film may have no adhesive properties initially, but the surface of the OPS film can become chemically changed by an electrolyte including dimethyl carbonate (DMC), ethyl methyl carbonate (EMC), propylene carbonate (PC) and/or the like. Therefore, the OPS film can have an adhesive property. The OPS film can be applied to the secondary battery advantageously because of its chemical and electrical safety.

More specifically, in the OPS film, bonding chains of its surface may become broken by the electrolyte as shown in the following Chemical Formula 1. Therefore, the OPS film can have an adhesive property.

[Chemical Formula 1]

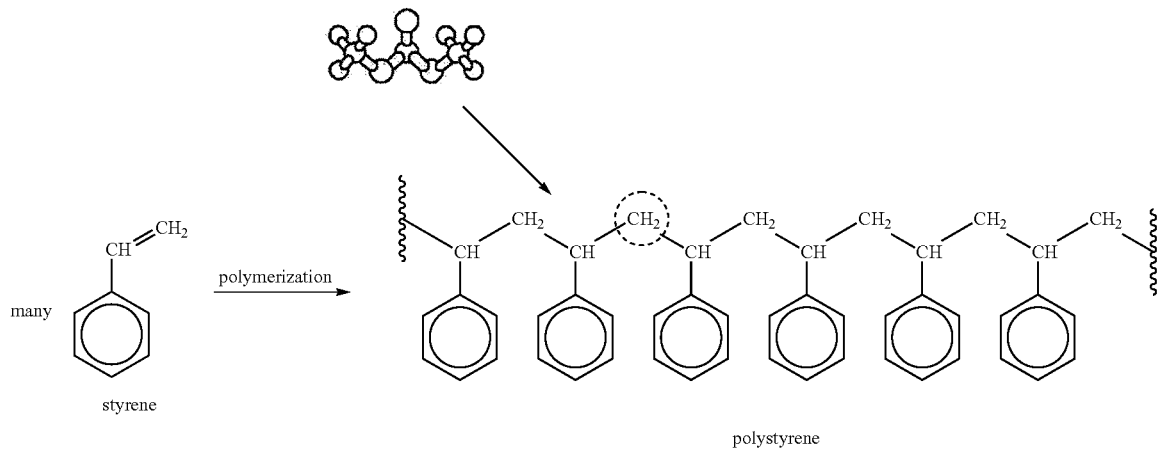

That is, if the electrode assembly 10 having the finishing material 15 attached thereto is accommodated in the pouch 20 and then immersed into the electrolyte, the finishing material 15 can become chemically changed. Therefore, the finishing material 15 can have an adhesive property. The electrode assembly 10 can become adhered closely to the pouch 20 by the adhesive property of the finishing material 15, thereby reinforcing the adhesion between the electrode assembly 10 and the pouch 20.

The OPS film may have no adhesion initially (when the electrolyte is not immersed). However, if the OPS film comes in contact with the electrolyte, it has an adhesive property. The adhesive property may have an adhesive strength of 6 to 10 kgf. As described above, if the electrolyte is immersed into the OPS film, the adhesion between the pouch 20 and the electrode assembly 10 can improve. Thus, it is possible to prevent the movement of the electrode assembly 10 and the bending of an electrode tab in the interior of the pouch 20.

The finishing material 15 may become attached to one surface of the electrode assembly 10 so as to increase the strength of the pouch 20 that forms an outer casing of the secondary battery. Thus, it is possible to protect the secondary battery from an external impact. Also, it is possible to prevent the electrode assembly 10 from swelling due to the initial charge/discharge of the secondary battery. Accordingly, a change in the outer dimension of the secondary battery can be reduced, so that the external appearance of the secondary battery becomes uniform. Also, the alignment state of the electrode assembly 10 can be stably maintained, thereby preventing internal short circuits and the like. Also, it is possible to prevent low battery charges due to the swelling of the electrode assembly 10.

The electrode assembly 10 according to the embodiment of the present invention may be formed by winding the first electrode plate 10a, the second electrode plate 10b and the separator 10c interposed therebetween. A first electrode tab 12a may be connected to the first electrode plate 10a to protrude upward from an upper end portion of the electrode assembly 10, and a second electrode tab 12b may be connected to the second electrode plate 10b to protrude upward from an upper end portion of the electrode assembly 10. In the electrode assembly 10, the first and second electrode tabs 12a and 12b may be formed spaced apart from each other at a predetermined distance.

Portions of first and second electrode tabs 12a and 12b extracted from the electrode assembly 10 may be wound by lamination tapes 11a and 11b, respectively. The lamination tape 11a or 11b can shield heat generated from the first or second electrode tabs 12a or 12b. The lamination tape 11a or 11b can allow the electrode assembly 10 to not become compressed by an edge of the first or second electrode tab 12a or 12b.

An insulating tape 13 may become adhered to a surface 22a for each of the first and second electrode tabs 12a and 12b that come in contact with the pouch 20. The insulating tape 13 may become partially protruded to the exterior of the pouch 20. When the cover portion 24 of the pouch 20 is folded and sealed to the top of the accommodating portion 22, the insulating tape 13 may be positioned at a region in which each of the first and second electrode tabs 12a and 12b is positioned between the cover portion 24 and the accommodating portion 22.

The pouch 20 may be formed of aluminum with a thickness of 0.04 to 0.05 mm. Therefore, when an impact is applied from the exterior of the pouch 20, the external appearance of the pouch 20 may be easily deformed. However, in this embodiment, the electrode assembly 10 can include a finishing material 15 having an adhesion on a surface of the electrode assembly 10 corresponding to the pouch 20. Therefore, the electrode assembly 10 may become attached to the pouch 20 by the finishing material 15. Accordingly, when an impact is applied from the exterior of the pouch 20, it is possible to prevent the external appearance of the pouch 20 from becoming deformed. That is, the finishing material 15 can improve the strength of the pouch 20 and prevent the movement of the electrode assembly 10 in the interior of the pouch 20.

Although a pouch-type secondary battery has been shown in FIGS. 1 and 2, the secondary battery of this embodiment may be applied to a can-type secondary battery. At this time, the finishing material 15 can function to prevent the electrode assembly 10 from moving in the interior of the secondary battery.

Figure 3:
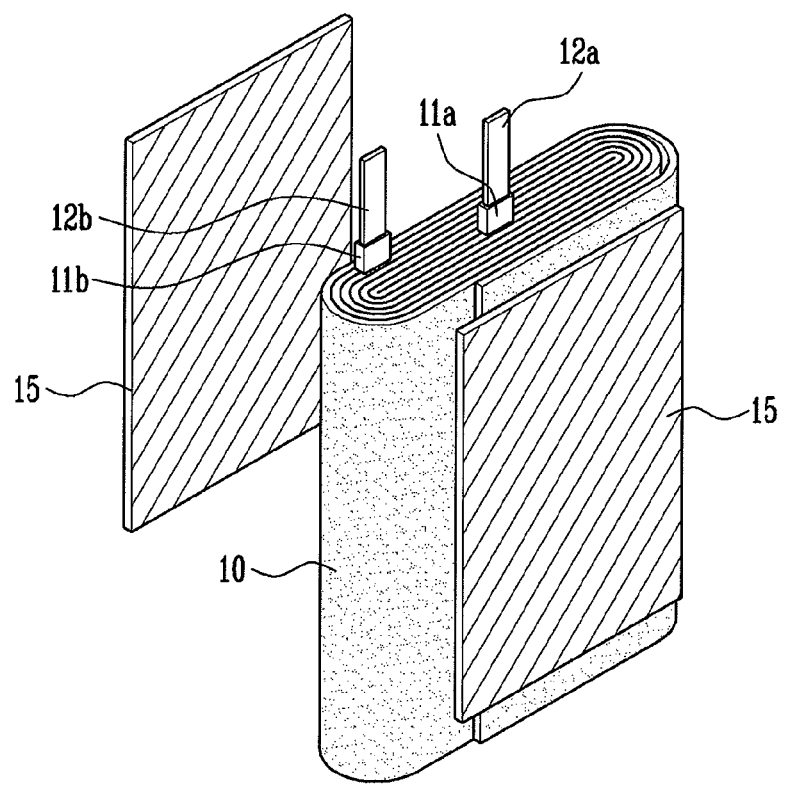
FIG. 3 is a perspective view of an electrode assembly according to another embodiment of the present invention.

FIG. 3 is a perspective view of an electrode assembly according to another embodiment of the present invention.

Referring to FIG. 3, finishing materials 15 may be attached to a major surface and the opposite major surface of the wound-type electrode assembly 10. If the finishing materials 15 are immersed in an electrolyte, they are chemically changed. Therefore, the finishing materials 15 have an adhesive property.

Accordingly, the surfaces of the electrode assembly 10 having the finishing materials 15 attached thereto can be adhered closely to the inner surface of a pouch. Thus, it is possible to prevent the electrode assembly 10 from being moved in the interior of the pouch. As such, the electrode assembly 10 is not moved in the pouch, so that it is possible to prevent electrode tabs 12a and 12b from becoming bent in the pouch. Thus, it is possible to enhance the reliability of the secondary battery in the long-term use of the secondary battery.

Figure 4:
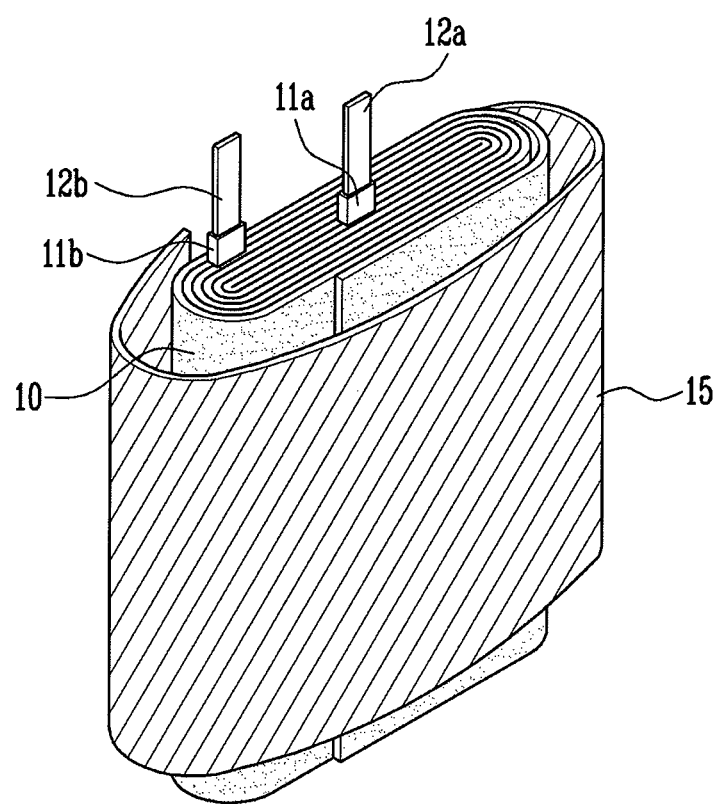
FIG. 4 is a perspective view of an electrode assembly according to still another embodiment of the present invention.

FIG. 4 is a perspective view of an electrode assembly according to another embodiment of the present invention.

Referring to FIG. 4, a finishing material 15 may become attached to surround the entire outer surface of the electrode assembly 10. The finishing material 15 may replace an external tape so that a finishing portion of the wound electrode assembly 10 does not unwind. As described above, an OPS film may be used as the finishing material 15. The surface of the OPS film may become chemically changed by an electrolyte, so that the OPS film has an adhesive property. Thus, the electrode assembly 10 and a pouch can be adhered closely to each other.

That is, if the electrolyte is immersed in the pouch, the finishing material 15 attached to surround the outer surface of the electrode assembly 10 can have an adhesive property. Thus, the outer surface of the electrode assembly 10 may become adhered closely to the inner surface of the pouch. As the adhesion between the electrode assembly 10 and the pouch is reinforced, the alignment state of the electrode assembly 10 can be stably maintained.

The secondary battery according to the embodiment of the present invention may be applied to a medium- or large-sized battery of which surface has a sectional area of 25 $cm^2$ or more. In this case, the inequality of the distribution of the electrolyte can be minimized. Thus, the uniformity of the external appearance of the secondary battery can improve.

Although the electrode assembly 10 formed by winding the first and second electrode plates 10a and 10b and the separator 10c interposed therebetween has been described in the aforementioned embodiment, the present invention is not limited thereto. The electrode assembly 10 may be a stacked-type electrode assembly formed by stacking a plurality of structures each having the first and second electrode plates 10a and 10b and the separator 10c interposed therebetween.

At this time, the finishing material may be attached to only one surface of the electrode assembly that comes in contact with the pouch or can-type case. Alternatively, the finishing material may be attached to opposite major surfaces of the electrode assembly. Alternatively, the finishing material may be attached to surround the entire outer surface of the electrode assembly.

Accordingly, the adhesion between the case and the electrode assembly can be improved. Thus, it is possible to prevent the movement of the electrode assembly and the bending of the electrode tabs in the interior of the case. Also, when the case is a pouch, it is possible to increase its strength. Also, in the medium- or large-sized pouch-type secondary battery, the inequality of the distribution of the electrolyte may become minimized, thereby improving the uniformity of the external appearance of the secondary battery. Also, the alignment state of the electrode assembly is stably maintained, thereby preventing internal short circuits. Thus, the reliability of the secondary battery can be enhanced in the long-term use of the secondary battery.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
an electrode assembly comprising a first electrode plate, a second electrode plate and a separator interposed therebetween;
an electrolyte;
a case for accommodating the electrode assembly and the electrolyte; and
a finishing material attached to an outer surface of the electrode assembly,
wherein the finishing material has an inner and an outer surface and an adhesive property on at least one of the inner or the outer surface wherein the finishing material is single layered and adheres the electrode assembly to the case by directly contacting both the electrode assembly and the case and wherein the finishing material is immersed in the electrolyte so that the finishing material becomes an adhesive;
wherein the finishing material comprises an oriented polystyrene (OPS) film.

2. The secondary battery according to claim 1, wherein the finishing material comprises an oriented polystyrene (OPS) film.

3. The secondary battery according to claim 2, wherein the OPS film has an adhesive strength of 6 to 15 kgf in the electrolyte.

4. The secondary battery according to claim 2, wherein the OPS film does not have the adhesive property when it is not immersed into the electrolyte.

5. The secondary battery according to claim 1, wherein the at least one surface is a major surface.

6. The secondary battery according to claim 5, wherein the finishing material is attached to the at least one major surface and another major surface opposite to the at least one major surface of the electrode assembly.

7. The secondary battery according to claim 1, wherein the finishing material is attached to the electrode assembly to completely surround the electrode assembly.

8. The secondary battery according to claim 1, wherein an exterior tape is further attached to a finishing portion of the electrode assembly.

9. A secondary battery comprising:
an electrode assembly;
a case for accommodating the electrode assembly;
an electrolyte in the case; and
a material coupled to a surface of the electrode assembly, wherein the material is single layered and configured to develop adhesion to at least a portion of the case upon contact with the electrolyte wherein the material directly contacts the electrode assembly and the case wherein the finishing material is immersed in the electrolyte so that the finishing material becomes an adhesive;
wherein the material comprises an oriented polystyrene (OPS) film.

10. The secondary battery according to claim 9, wherein the material comprises an oriented polystyrene (OPS) film.

11. The secondary battery according to claim 9, wherein the electrolyte is selected from the group consisting of dimethyl carbonate (DMC), ethyl methyl carbonate (EMC), and propylene carbonate (PC).

12. The secondary battery according to claim 9, wherein the material comprises a single sheet of material formed on a major surface of the electrode assembly.

13. The secondary battery according to claim 9, wherein the material comprises a single sheet of material formed on opposing major surfaces of the electrode assembly.

14. The secondary battery according to claim 9, wherein the material comprises a single sheet of material formed on every surface of the electrode assembly.

* * * * *